US008400322B2

(12) United States Patent
Acedo et al.

(10) Patent No.: US 8,400,322 B2
(45) Date of Patent: Mar. 19, 2013

(54) APPARATUS, SYSTEM, AND METHOD FOR SCALABLE MEDIA OUTPUT

(75) Inventors: Mario Francisco Acedo, Tucson, AZ (US); Ezequiel Cervantes, Tucson, AZ (US); Paul Anthony Jennas, II, Tucson, AZ (US); Jason Lee Peipelman, Vail, AZ (US); Matthew John Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 467 days.

(21) Appl. No.: 12/406,080

(22) Filed: Mar. 17, 2009

(65) Prior Publication Data

US 2010/0238041 A1    Sep. 23, 2010

(51) Int. Cl.
G08B 21/00 (2006.01)
G06F 3/038 (2006.01)
G06F 3/00 (2006.01)
G09G 5/00 (2006.01)
G09G 1/06 (2006.01)
G06T 17/00 (2006.01)
H04N 5/445 (2006.01)

(52) U.S. Cl. ............. 340/686.6; 345/204; 345/156; 345/428; 345/10; 348/564; 715/716

(58) Field of Classification Search ............. 340/686.6; 345/156, 428, 10
See application file for complete search history.

(56) References Cited

U.S. PATENT DOCUMENTS

| | | |
|---|---|---|
| 6,486,896 B1 | 11/2002 | Ubillos |
| 6,578,201 B1 | 6/2003 | LaRocca et al. |
| 6,636,487 B1 | 10/2003 | Roy |
| 6,928,087 B2 | 8/2005 | Slowe et al. |
| 2004/0160386 A1* | 8/2004 | Michelitsch et al. ........... 345/10 |
| 2005/0253807 A1* | 11/2005 | Hohmann et al. ............ 345/156 |
| 2007/0136459 A1 | 6/2007 | Roche et al. |
| 2007/0160038 A1 | 7/2007 | Liu et al. |
| 2008/0007654 A1* | 1/2008 | Ryu et al. ..................... 348/564 |
| 2008/0052624 A1* | 2/2008 | Roberts et al. ................ 715/716 |

OTHER PUBLICATIONS

Zaidel, BM. et al., Performance of lnear MMSE multiuser detection combined with a standard IS-95 uplink, ACM Digital Library, 1998.
Gomez, J. et al., Havana: Supporting Application and Channel Dependent QoS n Wireless Packet Networks, ACM Digital Library, 2003.
Erseghe, T. et al., Design and Performance Evaluation of a Full-Duplex Operating Receiver for Time-Hopping UWB, ACM Digital Library, 2006.

* cited by examiner

*Primary Examiner* — George Bugg
*Assistant Examiner* — Jack K Wang
(74) *Attorney, Agent, or Firm* — Kunzler Law Group, PC

(57) ABSTRACT

An apparatus, system, and method are disclosed for scalable media output. The apparatus includes a proximity sensor module to detect the presence and proximity of a user, and to generate presence and proximity data in response to the location of the user with respect to the proximity sensor module. The sensor control module is configured to scale the media output of a media device. The system includes the apparatus and a display module configured to output visual information and an audio module configured to output aural information. The method includes detecting the presence and proximity of a user, generating presence and proximity data in response to the location of the user with respect to a proximity sensor module, communicating the presence and proximity data with a sensor control module, and scaling the media output of a media device in response to the presence and proximity data.

21 Claims, 6 Drawing Sheets

APPARATUS, SYSTEM, AND METHOD FOR SCALABLE MEDIA OUTPUT

FIELD OF THE INVENTION

This invention relates to media output of media devices, and more particularly relates to scalable media output.

BACKGROUND

Description of the Related Art

Computers utilize electronic devices to convey information to a user. These electronic devices can convey audio and/or visual information to a user. Typically, audio information is conveyed through speakers, and visual information is conveyed through a visual display unit, often referred to simply as a "display." The speakers convey audio information transmitted from the audio output of the computer or other device. The display conveys images generated from the video output of the computer or other device.

The display and the speakers together are capable of presenting many forms of electronic media, such as audio and video recordings, multimedia presentations, advertisements, and online content. The media output, often times, is a combination of advertisements, online content, and audio and video recordings. Producers of electronic media pay particular attention to the format of the output or display device. For example, human recognizable elements must be formatted to remain "onscreen" whether the display is a standard 4:3 display, or a widescreen.

Other factors that a producer must consider include the environment the media is being presented in, and the distance at which the media is being observed. Users are increasingly consuming electronic media in new manners. For example, a desktop computer may be used in one instance for performing work functions such as word processing, and in another instance as a television. However, the distance between the display and the user may vary greatly between the two instances. In one instance the user is typically within reaching distance of the computer. Conversely, television is generally viewed at a distance of about 10 feet.

Settings such as screen resolution, font size, volume level of the speakers, etc., that are suitable at the "reachable distance" are not suitable for watching television at a distance. Therefore, what is needed is an apparatus, system, and method for scaling the media output according to the proximity of the user.

BRIEF SUMMARY

From the foregoing discussion, it should be apparent that a need exists for an apparatus, system, and method that scales media output. Beneficially, such an apparatus, system, and method would scale aural and visual output of a media device.

The present invention has been developed in response to the present state of the art, and in particular, in response to the problems and needs in the art that have not yet been fully solved by currently available media devices. Accordingly, the present invention has been developed to provide an apparatus, system, and method for scalable media output that overcome many or all of the above-discussed shortcomings in the art.

The apparatus to scale media output is provided with a plurality of modules configured to functionally execute the necessary steps of media output scaling. These modules in the described embodiments include a proximity sensor module configured to detect the presence and proximity of a user, and generate presence and proximity data in response to the location of the user with respect to the proximity sensor module. The proximity sensor module is also configured to communicate the presence and proximity data with a sensor control module. The sensor control module is configured to communicate with the proximity sensor module and scale the media output of a media device in response to the presence and proximity data.

The apparatus also includes a display module configured to communicate with the sensor control module and output visual information, and an audio module configured to communicate with the sensor control module and output aural information. The sensor control module is further configured to modify the volume of the audio module, and the visual output of a display module. The proximity sensor module may be selected from the group comprising of an infrared thermal sensor, an infrared photonic sensor, an optical camera, a laser range finder, a sonar range finder, and load measuring device.

The proximity sensor module may be configured to communicate with the sensor control module over a network or a computer bus. In one embodiment, the sensor control module modifies an application in response to the presence and proximity data. Examples of a media device include, but are not limited to, a desktop computer, a laptop computer, a handheld computing device, a handheld electronic device, a television, a projector, and a monitor.

A system of the present invention is also presented to scale media output. In particular, the system, in one embodiment, includes the apparatus, a display module configured to communicate with the sensor control module and output visual information, and an audio module configured to communicate with the sensor control module and output aural information.

A method of the present invention is also presented for media scaling. The method in the disclosed embodiments substantially includes the steps necessary to carry out the functions presented above with respect to the operation of the described apparatus and system. In one embodiment, the method includes detecting the presence and proximity of a user, and generating presence and proximity data in response to the location of the user with respect to a proximity sensor module.

The method may also include communicating the presence and proximity data with a sensor control module, and scaling the media output of a media device in response to the presence and proximity data. The method, in one embodiment, includes modifying the visual output of a display module in response to the presence and proximity data, and modifying the aural output of an audio module in response to the presence and proximity data. In a further embodiment, the sensor control module modifies an application in response to the presence and proximity data.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Figure 1:
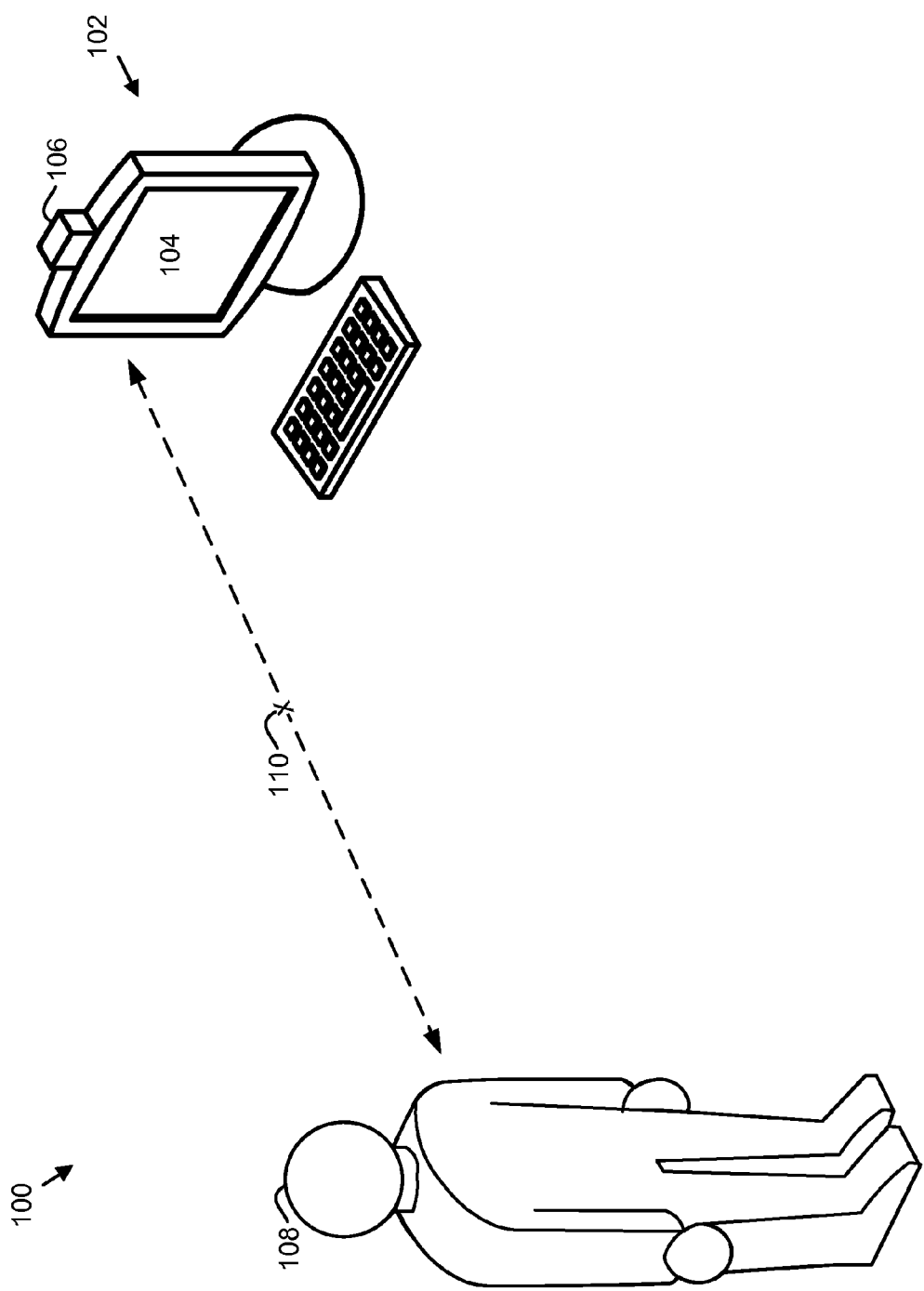
FIG. 1 is a perspective view diagram illustrating one embodiment of a system for scalable media.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission means, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a perspective view diagram illustrating one embodiment of a system 100 for scalable media. The system 100, in one embodiment, comprises an electronic device capable of presenting electronic media. The electronic device may comprise a computer 102 having a display 104, speakers (not shown), and a proximity sensor module 106. The electronic device, alternatively, may comprise a television, handheld electronic device, or other electronic device capable of conveying aural and visual information.

The proximity sensor module 106, in one embodiment, communicates with the electronic device and detects the presence and proximity of a user 108. As used herein, the term "presence" is defined as a user being within the range of the proximity sensor module 106. This range will vary depending upon the type of sensor used. The term "proximity" refers to the distance between the user and the media device, which in FIG. 1 is illustrated as the computer 102. Examples of devices capable of functioning as a proximity sensor in accordance with the present invention include, but are not limited to, infrared sensors, optical cameras, laser range finders, sonar range finders, and load measuring devices. The proximity sensor module 106 is configured to locate the user 108 by determining the distance x 110 between the user 108 and the computer 102. The proximity sensor module 106 may be further configured to determine the spatial relationship with reference to the computer 102. Furthermore, multiple proximity sensors modules 106 may be used to triangulate the position of the user 108.

In one example, the proximity sensor module 106 comprises an infrared sensor. The infrared sensor may be of the thermal or photonic type and capable of detecting the presence of a user by detecting the infrared radiation of a person against the background radiation of the environment. Distance x 110 may be determined by analyzing the infrared signal strength.

In another embodiment, the proximity sensor module 106 comprises an optical camera. The optical camera may comprise an image capturing device in communication with the computer 102. The image capturing device, in one embodiment, is a "webcam," or alternatively, a camera capable of communicating with the computer 102. The communication may occur over a Universal Serial Bus (USB) connection, IEEE 1394 interface, or wired or wireless network connection. The distance x 110 may be determined by comparing the position of the user 108 with pre-defined reference points (not shown).

In a further embodiment, the proximity sensor module 106 comprises a laser range finder. The laser range finder uses a laser beam to determine the presence and proximity of the user 108 by emitting a laser pulse and measuring the time taken for the pulse to be reflected and returned to the emitter.

In a similar fashion as the laser range finder, the proximity sensor module 106 may comprise a sonar range finder. The sonar range finder, in one embodiment, functions by emitting an ultrasonic pulse and then detecting the echo. The sonar range finder is configured to calculate the distance by measuring the time between the emission of the pulse and the detection of the echo multiplied by the estimated speed of sound. The sonar range finder is also configured to communicate this value with the computer 102. Alternatively, as with the laser range finder, the computer 102 may be configured to calculate the distance based upon a value communicated by the proximity sensor module 106.

In a further embodiment, the proximity sensor module 106 may comprise a load measuring device. For example, the proximity sensor module 106 may comprise a pressure sensitive mat in communication with the computer 102. The pressure sensitive mat is configured to detect the presence of the user 108. Alternatively, an array of presence sensors that detect a physical flexing of the flooring may be implemented and coupled with the computer 102. The computer 102 may be configured to interpret the information provided by the load measuring device and determine the distance x 110 of the user 108.

Figure 2:
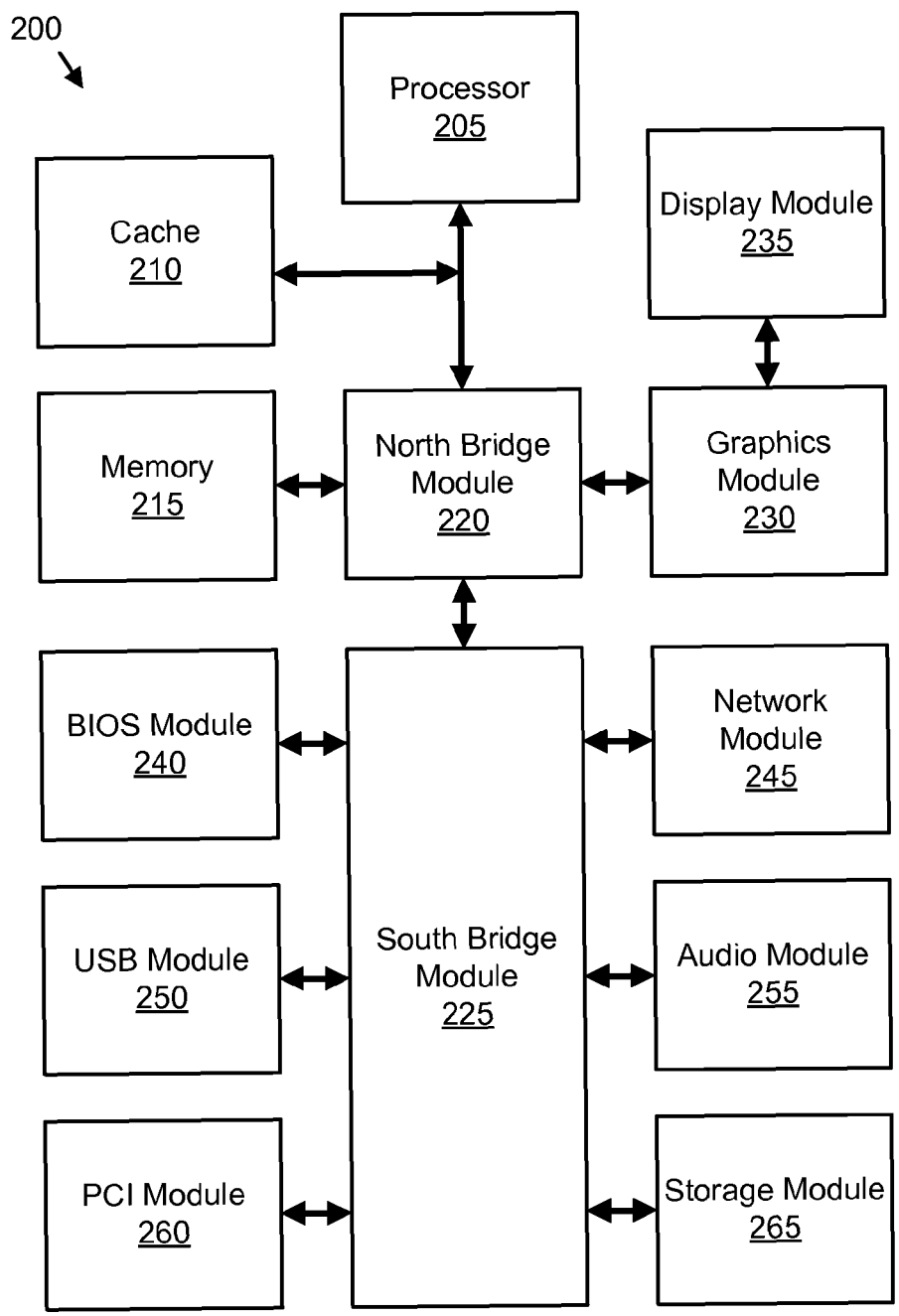
FIG. 2 is a schematic block diagram illustrating one embodiment of a computer in accordance with the present invention.

FIG. 2 is a schematic block diagram illustrating one embodiment of a computer 200 in accordance with the present invention. The computer 200 includes a processor 205, a cache 210, a memory 215, a north bridge module 220, a south bridge module 225, a graphics module 230, a display module 235, a BIOS module 240, a network module 245, a Universal Serial Bus (USB) module 250, an audio module 255, a Peripheral Component Interconnect (PCI) module 260, and a storage module 265. The computer 200 may embody the computer 102 of FIG. 1.

Although for simplicity, one processor 205, one cache 210, one memory 215, one north bridge module 220, one south bridge module 225, one graphics module 230, one display module 235, one BIOS module 240, one network module 245, one USB module 250, one audio module 255, one PCI module 260, and one storage module 265 are shown with the computer 200, any number of processors 205, caches 210, memories 215, north bridge modules 220, south bridge modules 225, graphics modules 230, display modules 235, BIOS modules 240, network modules 245, USB modules 250, audio modules 255, PCI modules 260, and storage modules 265 may be employed.

The processor 205, cache 210, memory 215, north bridge module 220, south bridge module 225, graphics module 230, display module 235, BIOS module 240, network module 245, USB module 250, audio module 255, PCI module 260, and storage module 265, are referred to herein as components. These modules may be fabricated of semiconductor gates on one or more semiconductor substrates. Each semiconductor substrate may be packaged in one or more semiconductor devices mounted on circuit cards. Connections between the components may be through semiconductor metal layers, substrate-to-substrate wiring, circuit card traces, and/or wires connecting the semiconductor devices.

The memory 215 stores executable code and data. The memory 215 may include a volatile memory selected from a Dynamic Random Access Memory (DRAM), a Static Random Access Memory (SRAM), or the like, a non-volatile memory such as read only memory (ROM), a flash memory, or the like.

The processor 205 processes the executable code and data. The processor 205 may communicate over an integrated circuit (IC) processor bus for example, of two gigahertz (2 GHz) to process the executable code and data. The processor 205 may also include sufficient memory to store small quantity of data. The memory of the processor 205 may include a plurality of system registers as is well known to those of skill in the art.

The storage module 265 may include one or more tangible storage devices such as optical storage devices, holographic storage devices, micromechanical storage devices, semiconductor storage devices, hard disk drives, magnetic tapes, or the like. The storage module 265 may communicate with the south bridge module 225 to store or access stored code and data. The code and data may tangibly be stored on the storage module 265. The code and data include a prompt module, a store module, a retrieve module, and an authentication module.

The processor 205 may communicate with the cache 210 through a processor interface bus to reduce average time to access the memory 215. The cache 210 may store copies of the data from the most frequently used storage module locations. The cache 210 may be controlled by a microcontroller in the storage module 265. The microcontroller may be a single IC and may have sufficient memory and interfaces needed for an application. The computer 200 may use one or more caches 210 for example, one or more DDR2 cache memories as is well known to those of skill in the art.

The north bridge module 220 may communicate with and hence may provide a bridging functionality between the processor 205 and the graphics module 230 through a 26-lane PCI express bus, the memory 215, and the cache 210. The north bridge module 220 may be configured as an IC as is well known to those of skill in the art. The processor 205 may be connected to the north bridge module 220 over, for example, a six hundred sixty seven Megahertz (667 MHz) front side bus as is well known to those of skill in the art.

The north bridge module 220 may be connected to the south bridge module 225 through a direct media interface (DMI) bus. The DMI bus may provide a high-speed bi-directional point-to-point link supporting a clock rate for example of the value of two gigabytes per second (2 GBps) in each direction between the north bridge module 220 and the south bridge module 225. The south bridge module 225 may be configured as an IC as is well known to those of skill in the art.

The south bridge module 225 may also include an integrated USB controller. The south bridge module 225 may communicate with the USB module 250 through the USB controller. The USB controller may support a Bluetooth interface, a built-in camera, a built-in track pad, a keyboard 110, an expresscard 34 slot, an external USB port, or the like.

In addition, the south bridge module 225 may communicate with the audio module 255 through an input-output (I/O) device. The audio module 255 may support a built-in microphone, a combination analog audio line-in and Digital Interconnect Format (DIF) digital optical audio line-in jack, a combined analog output and DIF digital optical audio line-out jack, or the like.

The PCI module 260 may communicate with the south bridge module 225 for transferring data or to power peripheral devices. The PCI module 260 may include a PCI bus for attaching the peripheral devices. The PCI bus can logically connect one or more peripheral devices such as printers, scanners, or the like. The PCI module 260 may be configured as a planar device IC and fitted onto a motherboard. The PCI module 260 may also be configured as an expansion card as is well known to those of skill in the art.

The network module 245 may communicate with the south bridge module 225 to allow the computer 200 to communicate with other devices over a network. The devices may include routers, bridges, computers, printers, and the like.

The BIOS module 240 may communicate instructions through the south bridge module 225 to boot the computer 200 or the notebook computer 100, so that software instructions stored on the memory 215 can load, execute, and assume control of the computer 200 or the notebook computer 100. Alternatively, the BIOS module 240 may comprise code and data embedded on a chipset that recognizes and controls various devices that make up the computer 200 or the notebook computer 100.

For example, the BIOS module 240 may carry out a Power On Self Test (POST) that ensures that the computer meets requirements to start-up properly, load a Bootstrap Loader to locate an operating system (OS), load a BIOS program or drivers that interface between the OS and hardware devices, and load a configuration program that may allow to configure hardware settings such as a hardware password, time, date, or the like.

The display module 235 may communicate with the graphics module 230 to display elements for example, of a login screen when the user boots the computer 200 or the notebook computer 100. The display module 235 may be the display 104 of FIG. 1.

Figure 3:
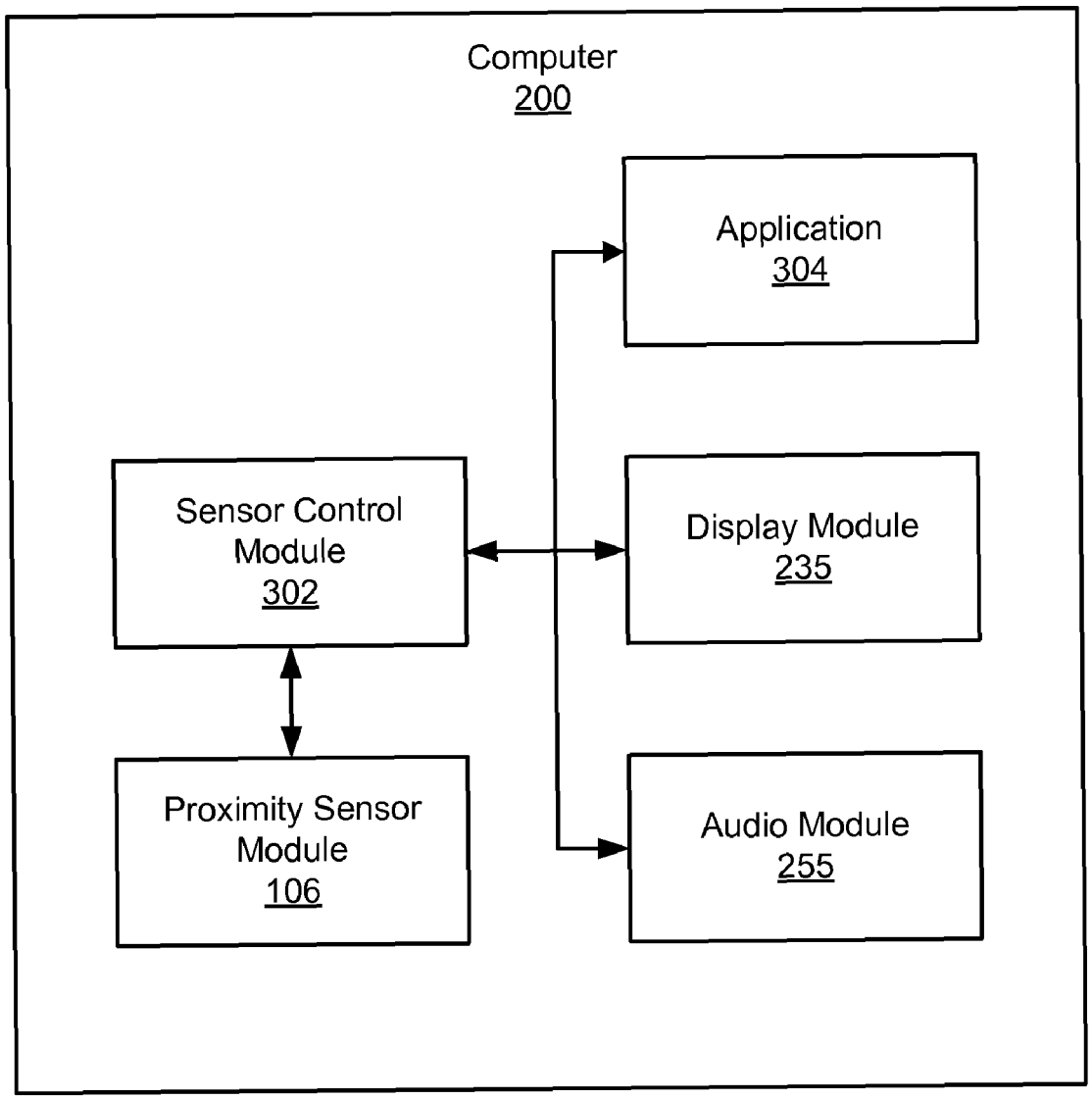
FIG. 3 is a schematic block diagram illustrating another embodiment of the computer in accordance with the present invention.

FIG. 3 is a schematic block diagram illustrating another embodiment of the computer 200 in accordance with the present invention. The computer 200, in one embodiment, further includes the proximity sensor module 106, display module 235, audio module 255, a sensor control module 302, and an application 304. As described above with reference to FIGS. 1 and 2, the proximity sensor module 106 is configured to detect the presence and proximity of a user. The proximity sensor module 106 may, in one embodiment, comprise a sonar range finder. Alternatively, the group of sensors capable of use in accordance with the present invention includes but is not limited to, infrared sensors, laser range finders, optical cameras, and load measuring devices as described above with reference to FIG. 1.

The proximity sensor module 106 is configured to communicate with the computer 200 by way of the sensor control module 302. The sensor control module 302, in one embodiment, may comprise a device driver. In another embodiment, the sensor control module may comprise an application control interface (API). Alternatively, the sensor control module 302 may be an integral part of the application 304. The depicted embodiment of FIG. 3, however, illustrates a schematic example of the sensor control module 302 in a "device driver" implementation. The sensor control module 302, therefore, is configured to communicate with and control the proximity sensor module 106 over a communication path. The communication path may comprise a USB connection, network path, or other subsystem transfer system such as a bus.

The sensor control module 302 is configured, in one embodiment, to communicate proximity data from the proximity sensor module 106 with the application 304, or alternatively, with the display module 235 and the audio module 255. The sensor control module 302 is configured to scale the media output based on the detection of a user presence, and further modify the media output based upon the distance of the user from the media device. Scaling the media output, in one embodiment, comprises: increasing the volume of a speaker when the user is farther away, decreasing the volume when the user is closer, or muting the volume when the user is out of the room; and increasing or decreasing the default font size of applications 304 based upon user proximity.

The sensor control module 302 is further configured to modify an application or operating system based upon proximity or presence of the user. Examples include, but are not limited to: changing application status based on proximity or presence; launching an application based on presence or proximity; automatically locking or logging into a computer based on presence or proximity; auto saving documents based on presence or proximity; resynchronize cached network applications depending on proximity or presence; or compiling code based upon proximity.

In one embodiment, changing application status based on proximity or presence comprises updating the "available" status of an instant messaging program, social networking website, or other presence enabled "chat" programs. One example of launching an application includes, but is not limited to, launching time-tracking software, or launching a backup program for backing up files when the user is not present. One example of auto saving a document based on presence includes, but is not limited to, triggering a word processing program to auto save the contents of any document currently open.

In one embodiment, resynchronizing cached network applications includes synchronizing an email inbox with an email server. Another example of resynchronizing cached network applications includes, but is not limited to, reconnecting or synchronizing a network drive or offline network files.

Figure 4:
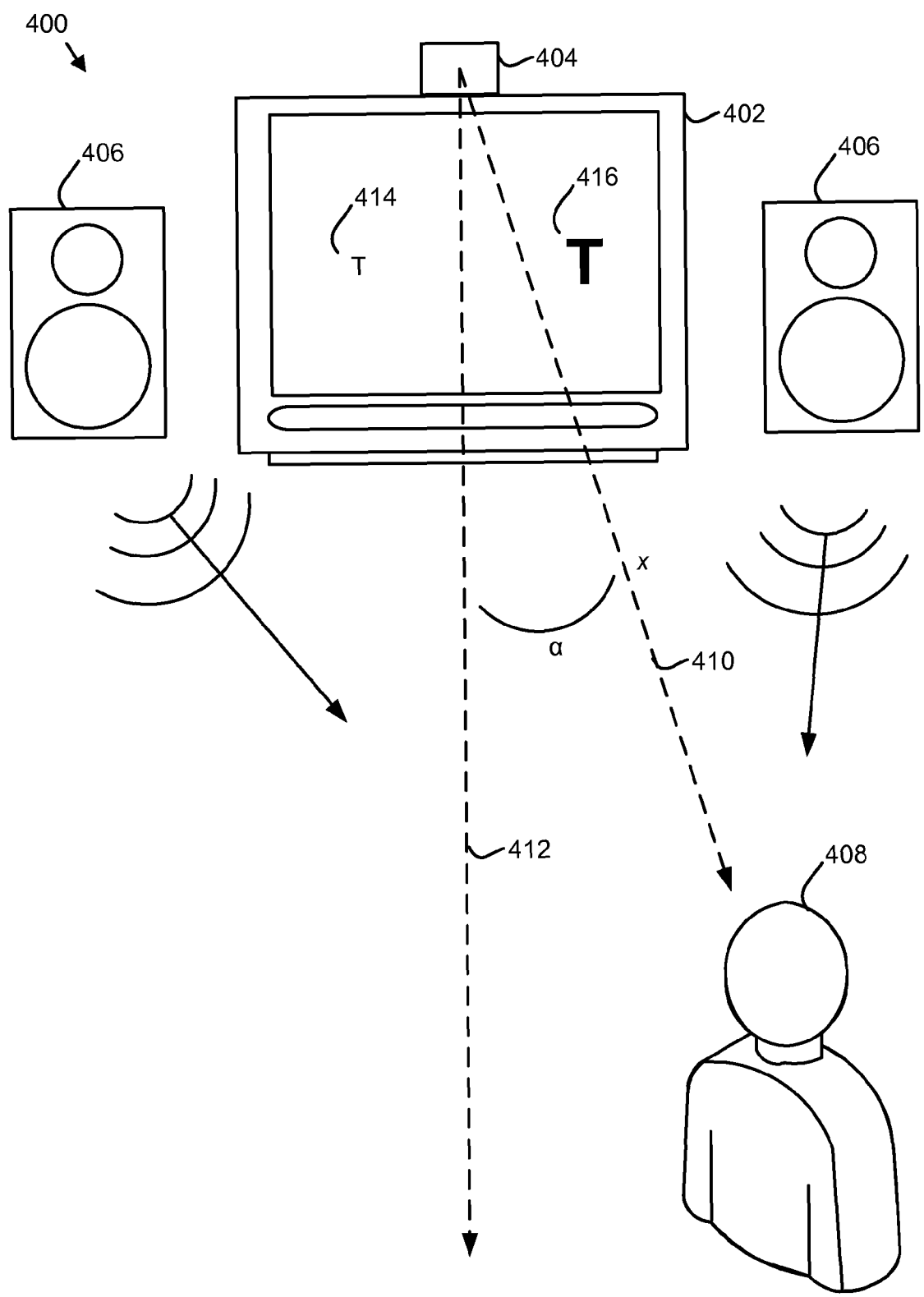
FIG. 4 is a perspective view diagram illustrating one embodiment of a system for scaling media output in accordance with the present invention.

FIG. 4 is a perspective view diagram illustrating one embodiment of a system 400 for scaling media output in accordance with the present invention. In the depicted embodiment, the system includes a display 402, a proximity sensor module 404, and speakers 406. The proximity sensor module 404 is substantially similar to the proximity sensor module 106 of FIG. 1. The proximity sensor module 404 is configured to detect the presence and proximity of the user 408.

In one embodiment, detecting the presence and proximity of the user 408 may comprise defining, for example, coordinates of the user 404 and communicating the presence and proximity of the user 408. Alternatively, the proximity sensor 404 may define a vector 410 as depicted in FIG. 4. For example, the proximity sensor module 404 may be configured to determine the proximity of the user by determining an angle α and a distance x between the user and the display 402. The angle α, in one embodiment, may be the angle between the user 408 and a plane extending outward perpendicularly from the proximity sensor module 404, as indicated graphically by line 412.

As described above, the sensor control module, of FIG. 3, receives the proximity/presence information and scales the media output or modifies an application. For example, the sensor control module may increase the font 414, 416 of text displayed on the display 402. In a further embodiment, the sensor control module is configured to increase or decrease the volume of the speakers 406 accordingly. Additionally, the sensor control module 404 may be configured to rotate or direct the sound of the speakers toward the user 408. In one embodiment, directing or rotating the speakers may comprise commanding a device (not shown) to physically rotate the speakers. Alternatively, the volume may be increased in the speaker 406 furthest away from the user 408 to "balance" the sound for the user 408. In an additional embodiment, the speakers 406 may be configured with directional components configured to communicate and respond to command data from the sensor control module.

In a further embodiment, the proximity sensor module 404 is configured to analyze the ambient conditions of the area of the system 400 and scale the media output accordingly. For example, the proximity sensor module 404 may be configured to determine the level of ambient light, communicate the ambient light data with the sensor control module which subsequently adjusts the brightness of the display 402. Likewise, the proximity sensor module 404 may be configured to measure the ambient sound and communicate the ambient sound data with the sensor control module which subsequently adjusts the volume of the speakers 406 accordingly.

In one embodiment, the sensor control module may be configured to command a device (not shown) to rotate the display 402 towards the position of the user 408. The device, for example, may comprise a rotatable table having an electric motor configured to respond to the sensor control module. Alternatively, the sensor control module may be configured to "skew" the screen in one direction, for example, "keystone" the image slightly if the user 408 is located at an extreme angle with reference to the plane 412. In one embodiment, an extreme angle is in the range of between about 40 and 90 degrees.

Figure 5:
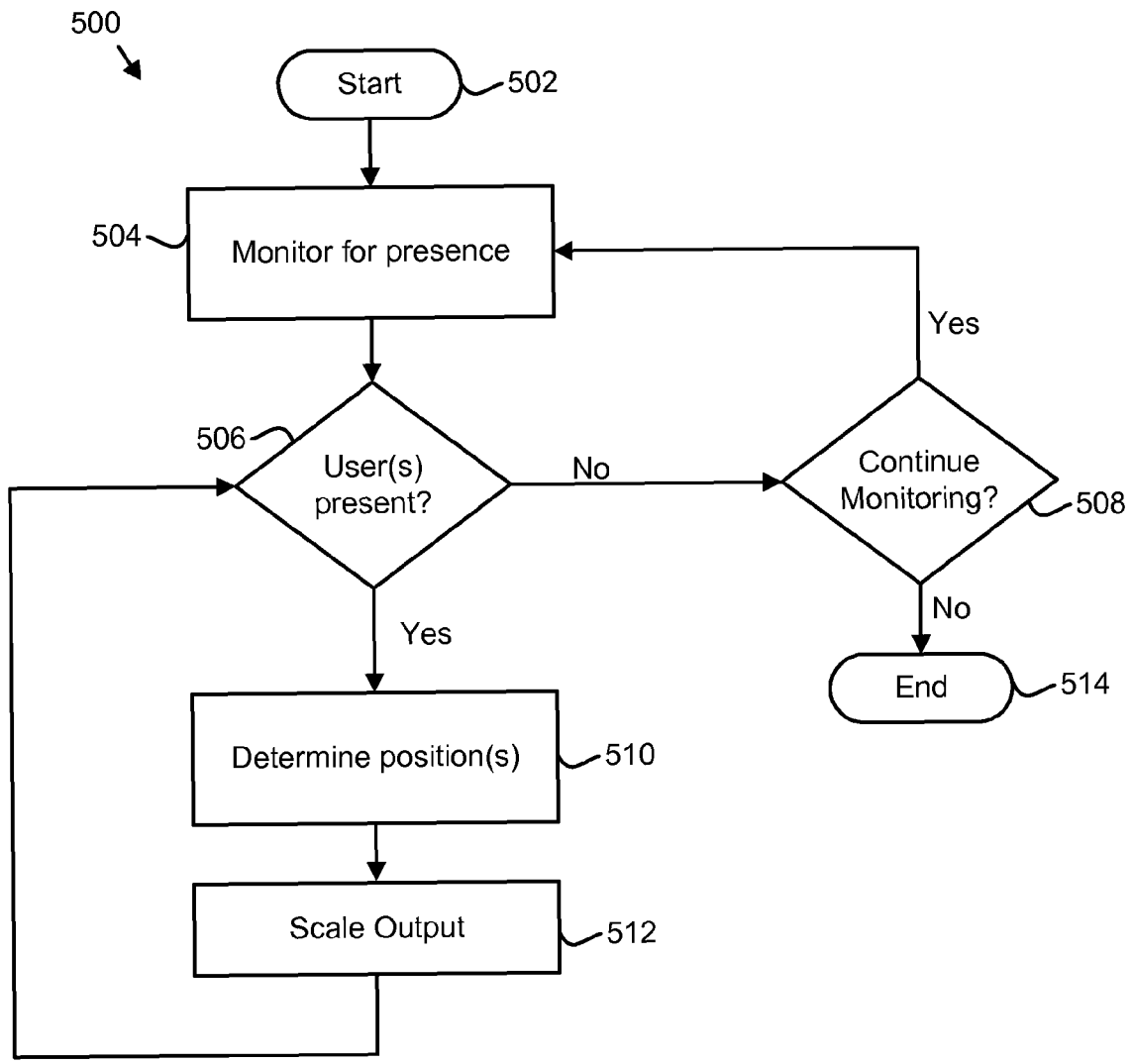
FIG. 5 is a schematic flow chart diagram illustrating one embodiment of a method for scaling media output in accordance with the present invention.

FIG. 5 is a schematic flow chart diagram illustrating one embodiment of a method 500 for scaling media output in accordance with the present invention. In one embodiment, the method 500 starts 502 and the proximity sensor module 106 monitors 504 for the presence of a user. If there is 506 no person present, and media continues to display, then the sensor control module 302 commands the proximity sensor module 106 to continue monitoring 508, 504 until a user is detected.

When a user is detected 506, the proximity sensor module 106 determines 510 the position of the user and subsequently scales 512 the media output according to the position of the user. While the person is present 506, the proximity sensor module 102 continues to determine the position of the user, communicate the position date of the user with the sensor control module 306 which subsequently scales 512 the output of the media. In one embodiment, scaling the output of the display comprises scaling the font of text on the display, the volume of the speakers, and the brightness of the display. Furthermore, any number of audio and visual parameters may be modified according to the position of the user, and the type of media being presented to the user. The method 500 ends 514 when the media playback is finished or the user turns off the media display device.

Figure 6:
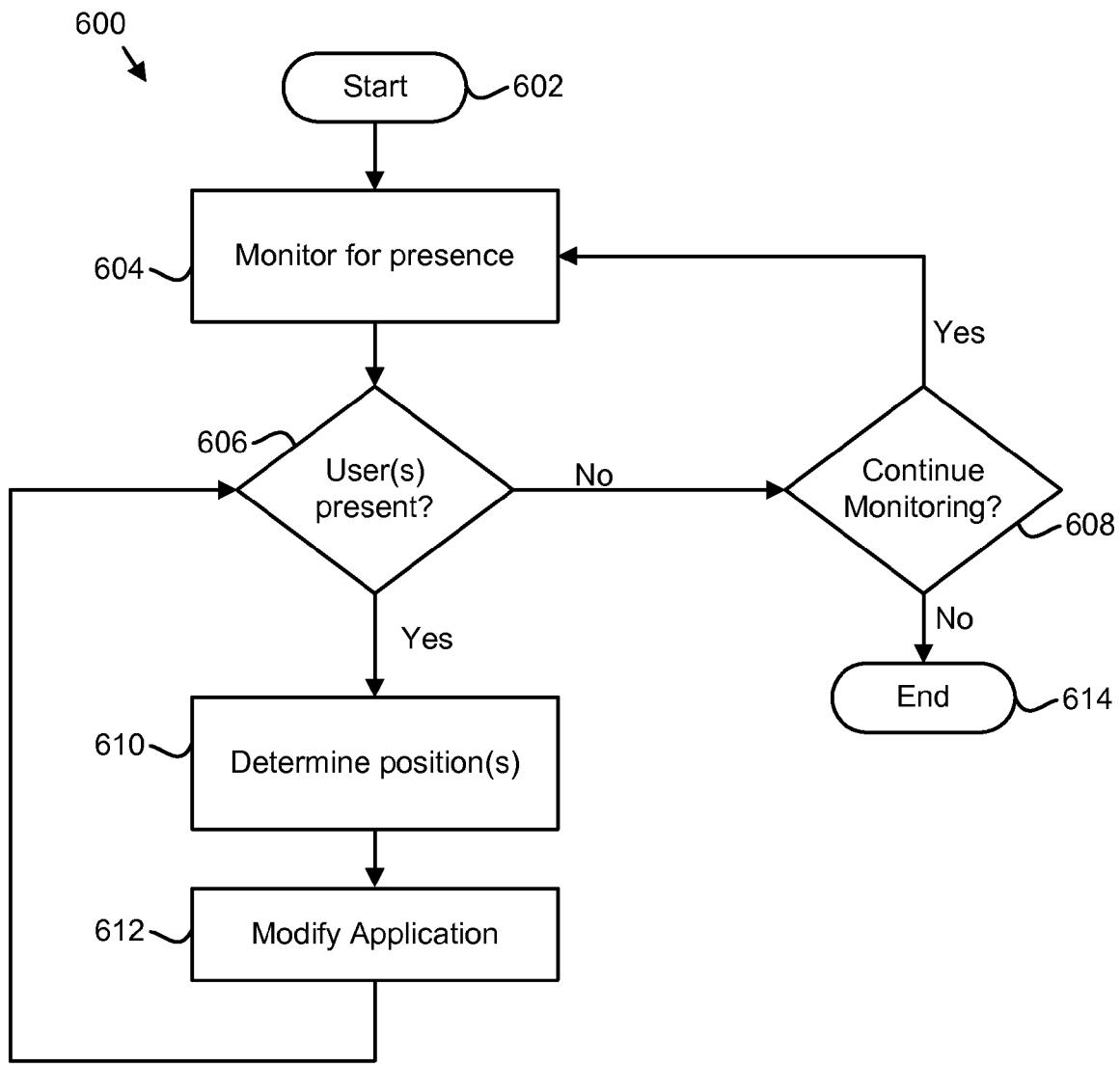
FIG. 6 is a schematic flow chart diagram illustrating one embodiment of a method for modifying an application in accordance with the present invention.

FIG. 6 is a schematic flow chart diagram illustrating one embodiment of a method 600 for modifying an application in accordance with the present invention. In one embodiment, the method 600 starts 602 and the proximity sensor module 106 monitors 604 for the presence of a user. If there is 606 no person present, then the sensor control module 302 commands the proximity sensor module 106 to continue monitoring 608, 604 until a user is detected.

If a user is detected 606, the proximity sensor module 106 determines 610 the position of the user as described above with reference to FIG. 4. The proximity sensor module 106 then communicates the position data with the sensor control module 302 which modifies 612 an application. Modifying an application, in one embodiment, includes but is not limited to launching a computer application, changing instant messaging availability, automatically locking or logging into a computer, auto-saving a document, synchronizing cached network resources, or compiling code. The method 600 ends 614 when the media playback is finished or the user turns off the media display device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to scale media output, the apparatus comprising: a proximity sensor module configured to detect the position and proximity of a user, generate position and proximity data in response to the location of the user with respect to the proximity sensor module, and communicate the position and proximity data with a sensor control module; wherein the position and proximity data comprises a distance and an angle between a media device and the user; wherein the media device includes a display and a plurality of speakers; and the sensor control module configured to communicate with the proximity sensor module and skew the media output of the media device in response to the position and proximity data such that the display is keystoned and a volume is increased in at least one of the plurality of speakers to compensate for the distance and angle of the user, wherein the volume is adjusted proportionally to the proximity of the user and muted when the user is out of the room.

2. The apparatus of claim 1, further comprising a display module configured to communicate with the sensor control module and output visual information.

3. The apparatus of claim 2, wherein the sensor control module is further configured to modify the visual output of the display module in response to the position and proximity data.

4. The apparatus of claim 1, further comprising an audio module configured to communicate with the sensor control module and output aural information.

5. The apparatus of claim 4, wherein the sensor control module is further configured to balance sound for the user, wherein balancing the sound comprises one or more of:
- directing the sound of the speakers toward the user;
- physically rotating the speakers toward the user; and
- increasing the volume in a speaker furthest away from the user.

6. The apparatus of claim 1, wherein the proximity sensor module is selected from the group consisting of an infrared thermal sensor, an infrared photonic sensor, an optical camera, a laser range finder, a sonar range finder, and load measuring device.

7. The apparatus of claim 1, wherein the proximity sensor module is configured to communicate with the sensor control module over a network.

8. The apparatus of claim 1, wherein the proximity sensor module is configured to communicate with the sensor control module over a computer bus.

9. The apparatus of claim 1, wherein the sensor control module is further configured to modify an application in response to the position and proximity data.

10. The apparatus of claim 1, wherein the media device is selected from the group consisting of a desktop computer, a laptop computer, a handheld computing device, a handheld electronic device, a television, a projector, and a monitor.

11. A system to scale media output, the system comprising: a proximity sensor module configured to detect the position and proximity of a user, generate position and proximity data in response to the location of the user with respect to the proximity sensor module, and communicate the position and proximity data with a sensor control module; wherein the position and proximity data comprises a distance and an angle between a media device and the user; wherein the media device includes a display and a plurality of speakers; and the sensor control module configured to communicate with the proximity sensor module and skew the media output of the media device in response to the position and proximity data such that the display is keystoned and a volume is increased in at least one of the plurality of speakers to compensate for the distance and angle of the user, wherein the volume is adjusted proportionally to the proximity of the user and muted when the user is out of the room; a display module configured to communicate with the sensor control module and output visual information; and an audio module configured to communicate with the sensor control module and output aural information.

12. The system of claim 11, wherein the sensor control module is further configured to modify the font of the display module in response to the position and proximity data.

13. The system of claim 11, wherein the sensor control module is further configured to modify the volume of the audio module.

14. The system of claim 11, wherein the proximity sensor module is selected from the group consisting of an infrared thermal sensor, an infrared photonic sensor, an optical camera, a laser range finder, a sonar range finder, and load measuring device.

15. The system of claim 11, wherein the proximity sensor module is configured to communicate with the sensor control module over a network.

16. The system of claim 11, wherein the proximity sensor module is configured to communicate with the sensor control module over a computer bus.

17. The system of claim 11, wherein the sensor control module is further configured to modify an application in response to the position and proximity data.

18. A computer program product comprising a computer readable program stored on a non-transitory computer readable storage device, wherein the computer readable program when executed on a computer causes the computer to: detect the position and proximity of a user; generate position and proximity data in response to the location of the user with respect to a proximity sensor module; wherein the position and proximity data comprises a distance and an angle between a media device and the user; communicate the position and proximity data with a sensor control module; and skew the media output of a media device in response to the position and proximity data such that a display is keystoned and a volume is increased in at least one of a plurality of speakers to compensate for the distance and angle of the user, wherein the volume is adjusted proportionally to the proximity of the user and muted when the user is out of the room.

19. The computer program product of claim 18, wherein the sensor control module modifies the visual output of a display module in response to the presence and proximity data.

20. The computer program product of claim 18, wherein sensor control module modifies the aural output of an audio module in response to the presence and proximity data.

21. The computer program product of claim 18, wherein the sensor control module modifies an application in response to the presence and proximity data.

* * * * *